Patented Oct. 30, 1934

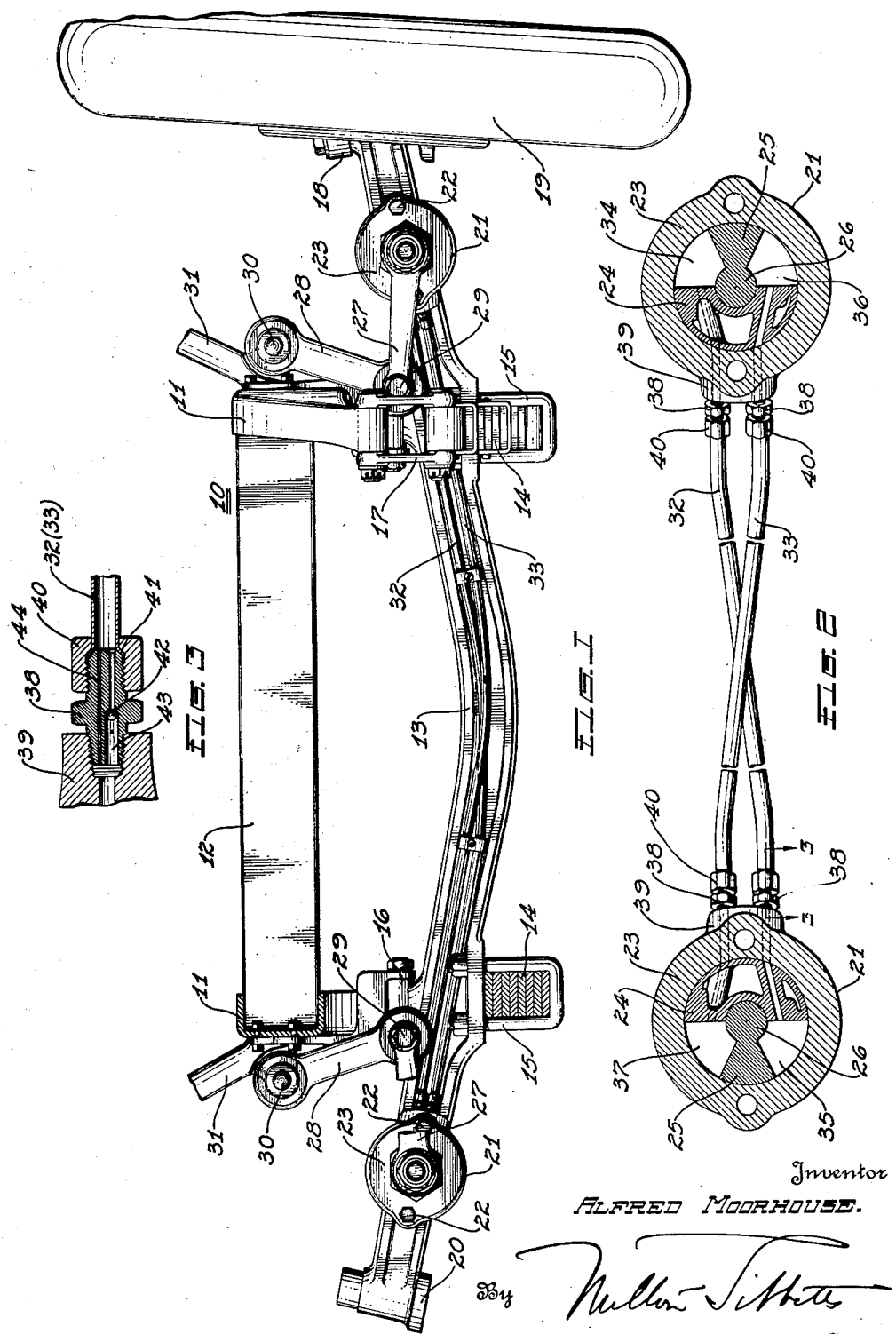

1,978,908

UNITED STATES PATENT OFFICE 1,978,908

MOTOR VEHICLE

Alfred Moorhouse, Detroit, Mich., assignor to Packard Motor Car Company, Detroit, Mich., a corporation of Michigan Application January 21, 1928, Serial No. 248,353
Renewed January 25, 1933

8 Claims. (Cl. 267—11)

This invention relates to motor vehicles and particularly to means for controlling the relative movement of the axle and frame to improve the riding qualities of the vehicle.

The present invention constitutes an improvement in the structure disclosed in my Patent No. 1,823,694. In that patent is disclosed a hydraulic shock absorbing means adapted to prevent "wheel shimmy" by controlling the movement of a vehicle axle so as to obviate oscillatory movement thereof in a vertical plane about its center. This result is achieved by interposing a hydraulic shock absorber between the frame and each end of the axle and so interconnecting the working chambers of both shock absorbers by pipe lines or conduits that liquid will flow relatively freely from one to the other upon movement of the axle in parallel relation to the frame but flow of liquid from one to the other will be restricted upon any tendency of the axle to oscillate in a vertical plane. In one form of the invention therein disclosed, the piston of each shock absorber carries a check valve which provides in the shock absorbing action a minimum of resistance to downward movement of the frame in parallel relation to the axle, an increased or greater resistance on the rebound or upward movement of the frame and a still greater resistance to oscillatory movement of the axle or movement of the frame and axle in non-parallel relation. This arrangement thus provides a shock absorbing action upon the rebound or upward movement of the frame in addition to preventing any movement of the axle tending to cause "wheel shimmy". It is one of the objects of the present invention to improve upon the arrangement referred to for so controlling the movement of the axle relative to the frame as to prevent "wheel shimmy".

Another object of the invention is to provide an improved hydraulic shock absorbing means permitting a relatively free movement of the axle toward the frame in parallel relation therewith and which resists to a certain degree or extent the rebound or movement of the axle in parallel relation away from the frame and which offers a greater degree or extent of resistance to movement of the axle in non-parallel relation to the frame.

Other objects of the invention will appear from the following description taken in connection with the drawing, which forms a part of this specification, and in which:

Fig. 1 is a view in elevation, with parts in section, showing the front end of a motor vehicle embodying the invention;

Fig. 2 is an enlarged view showing the shock absorbers in section and their interconnecting conduits, and Fig. 3 is an enlarged sectional view substantially on the line 3—3 of Fig. 2.

Referring to the drawing, 10 represents generally the frame of a motor vehicle, one of the side members 11 of which is shown in section and the other in front elevation. The side members are connected by a cross member 12 secured in any suitable manner to the side members. One of the axles of the vehicle is shown at 13 and in the embodiment selected for illustration, the front or steering axle is shown. The frame is supported on the axle by underslung front springs 14 connected to the axle by U-bolts 15. The ends of the springs are connected to the frame, the rear pivoted connection being shown at 16 and the front shackle connection being shown at 17.

At the ends of the axle 13 are the usual steering knuckles 18 upon which are pivotally mounted the wheels 19. At the right of Fig. 1 the steering knuckle and wheel are shown, whereas at the left of that figure only the bearing portion 20 of the axle is shown, but it will be understood that both ends of the axle are similar in this respect.

The shock absorbing or axle control means comprises two similar hydraulic shock absorbers 21 connected between the frame and axle. The shock absorbers are mounted upon the axles adjacent the ends thereof by means of bolts 22 engaging the cylindrical casings 23 of the absorbers. Each casing has a partition or abutment 24 therein, as shown in Fig. 2, and an oscillatory vane type of piston 25 is operatively mounted in the casing. The shaft 26 upon which the piston is mounted extends through one end of the casing and has mounted thereon an operating arm 27 connected to the frame of the vehicle through a link or connecting rod 28. A joint 29 connects link 28 to the arm 27 and a similar joint 30 connects the link 28 to a bracket 31 secured on the side member of the frame.

Ordinarily in shock absorbers of this general type, the liquid in the working chamber, or the chamber in which the piston moves, is by-passed from one side of the piston to the other so that movement of the piston, caused by movement of the axle relative to the frame, would be resisted by the liquid to a limited extent. In the present invention, however, instead of bypassing the liquid from one side of the piston to the other in the same shock absorber, the liquid is by-passed from one side of the piston of one shock absorber to the opposite side of the piston of the other shock absorber. The same is true also of the other shock absorber in that a second by-pass is provided from one side of its piston to the opposite side of the piston of the first shock absorber. These by-passes or conduits are in the form of pipes 32 and 33 extending from one shock absorber to the other and as may be seen in Fig. 2, pipe 32 connects the compartment 34 above piston 25 of the right hand shock absorber with the compartment 35 below piston 25 of the left hand shock absorber and similarly, pipe 33 connects compartments 36 and 37 of the two shock absorbers. The conduits forming continuations of pipes 32 and 33 within the casings 23 and partitions 24, are shown either in section or in dotted lines in Fig. 2.

Operating arms 27 are mounted on opposite sides of the shafts 26 from the pistons 25 so that an upward movement of the axle would cause an upward movement of the pistons 25 and vice versa. With this arrangement of the shock absorbers and their interconnecting pipes, relative movement of the frame and axle in parallel relation, that is, movement of both ends of the axle relative to the frame in the same direction and to the same extent or movement of both sides of the frame relative to the axle in the same direction and to the same extent, there will be a transfer of liquid from compartment 34 to compartment 35 or vice versa and simultaneously an equal quantity will be transferred from compartment 37 to compartment 36 or vice versa.

Interconnecting pipes 32 and 33 are secured to the shock absorber casings through the medium of connections 38 shown in enlarged section in Fig. 3. Each of the connections 38 is threaded into a boss 39 of the casing 23 of the shock absorber and a cap 40 is threaded onto the connection 38 and binds the expanded end 41 of the interconnecting pipe to the connection. Connection 38 for the left hand end of pipe 32 is shown in section in Fig. 3. It is provided with a ball check valve 42 opening toward the absorber to which it is secured or, in other words, having the larger portion of the check valve passage 43 toward the absorber to which the connection is attached, and the connection is drilled as at 44 to provide a by-pass around the check valve 42. Connection 38 at the right hand end of pipe 33 should be the same in that its check valve should open toward the absorber to which it is secured. At the other ends of pipes 32, 33 connections 38 should be reversed so that the check valves in the same pipe will operate in the same direction. By-pass 44 as shown in connections 38 is of smaller cross-sectional area than the smaller portion of the check valve passage, but it will be understood that the cross-sectional area of these passages may be varied to secure the desired degree of resistance of the shock absorbers to relative movement of the frame and axle. Thus with the check valves of pipe 32 opening toward the left hand absorber and away from the right hand absorber, and the check valves of pipe 33 opening away from the left hand absorber and towards the right hand absorber, downward movement of the frame in parallel relation to the axle, or movement of the frame and axle in parallel relation toward each other, will cause liquid to flow through the open check valves and by-passes from the upper compartment of each shock absorber to the connected lower compartment of the other, resulting in a minimum of resistance to such relative movement of the frame and axle. On the rebound, however, or upon upward movement of the frame in parallel relation to the axle, or movement of the frame and axle away from each other in parallel relation, the check valves will close and the liquid may pass from the lower compartment of each shock absorber to the connected upper compartment of the other shock absorber through by-passes 44 only. A restricted passage is thus provided for interchange of the liquid upon such rebound movement and consequently some resistance, depending upon the cross-sectional area of the by-passes, will be offered to such movement.

If the movement of the axle relative to the frame becomes oscillatory or other than a movement in parallel relation, one of the pistons 25 immediately acts as an abutment and transfer of liquid from one shock absorber to the other is retarded to a greater degree than with any other movement. Thus, if both axle ends are moving upwardly or toward the frame, but one is moving faster than the other, or in non-parallel relation, the resistance will be greater due to the fact that one piston is not moving as fast as the other. Likewise, if one end of the axle is moving upwardly and the other downwardly, perhaps in synchronism and at the same rate of speed, yet the movement of the axle will not be in parallel relation with respect to the frame and one piston will be moving upwardly and the other downwardly with the result that each will be acting as an abutment for the other and a maximum of resistance will be offered.

These connections between the frame and axle together with the connections between the shock absorbers tend always toward a movement of the axle in parallel relation with respect to the frame while allowing or permitting a relatively free movement of the frame and axle toward each other in parallel relation; a somewhat more restricted movement of the two away from each other in parallel relation on the rebound and offers the maximum resistance to non-parallel movement of the axle relative to the frame. In this way "wheel shimmy" is prevented at the same time that a desirable amount of resistance is offered to relative movement of the frame and axle on the rebound.

It will be understood that various forms of the invention other than those described above may be used without departing from the spirit or scope of the invention.

Having thus described my invention, what I claim and desire to secure by Letters Patent is:

1. In a motor vehicle, the combination with the frame and axle, of two shock absorbers connected adjacent the ends of said axle and to the frame, and interconnecting means provided with a check valve and a by-pass for the check valve extending between said shock absorbers.

2. In a motor vehicle, the combination with the frame and axle, of a hydraulic shock absorber connected adjacent each end of the axle and to the frame, and connections provided with check valves and by-passes for the check valves between said shock absorbers.

3. In a motor vehicle, the combination with the frame and axle, of two shock absorbers having working chambers and connected between the frame and axle, a pipe connection from each side of the working chamber of one shock absorber to the opposite side of the working chamber of the other shock absorber, a check valve in each of said pipe connections and a by-pass for each of said check valves.

4. In a motor vehicle, the combination of frame and axle members, two hydraulic shock absorbers connected between said members, connections between the shock absorbers each having a pair of passages therein, and a check valve in one of the passages in each connection.

5. In a motor vehicle, the combination with frame and axle members, of hydraulic shock absorbers connected intermediate the frame and the axle members, connections between the shock absorbers each having a pair of passages in a portion thereof, and a check valve in one of the passages in each connection.

6. In a motor vehicle, the combination with a frame and an axle, of hydraulic shock absorbers connected between the frame and the axle, connections between the shock absorbers through which fluid is free to flow at all times, and valve means in each connection restricting the flow of the fluid therethrough in opposite directions.

7. In a motor vehicle, the combination with a load supporting means and a wheel carrying means, of a pair of hydraulic shock absorbers connected between the wheel carrying means and the load supporting means, said shock absorbers each having a working chamber and a piston in the chamber, a pair of open fluid conduit means establishing communication between the chambers of the shock absorbers on different sides of the pistons, a restricted passage and a by-pass therearound adjacent each end of the pair of conduit means, and one-way valve means in the by-passes, the two valve means in each conduit opening in the same directions and the valve means of one conduit opening in the opposite direction to such means in the other conduit.

8. In a motor vehicle, the combination with a load supporting means and a wheel carrying means, of a pair of hydraulic shock absorbers connected between the wheel carrying means and the load supporting means, said shock absorbers each having a working chamber and a piston in the chamber, a pair of open fluid conduit means establishing communication between the chambers of the shock absorbers on different sides of the pistons, a restricted passage and a by-pass therearound adjacent each end of the pair of conduit means, and one-way valve means in the by-passes, the two valve means in each conduit opening one toward and one away from its adjacent shock absorber.

ALFRED MOORHOUSE.